(12) United States Patent
Kobashi et al.

(10) Patent No.: US 11,511,551 B2
(45) Date of Patent: Nov. 29, 2022

(54) IMAGE FORMING APPARATUS

(71) Applicant: Ricoh Company, Ltd., Tokyo (JP)

(72) Inventors: Toshiyuki Kobashi, Kanagawa (JP); Satoyuki Sekiguchi, Kanagawa (JP); Taku Hatakeyama, Kanagawa (JP); Takashi Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 81 days.

(21) Appl. No.: 17/027,768

(22) Filed: Sep. 22, 2020

(65) Prior Publication Data

US 2021/0094319 A1 Apr. 1, 2021

(30) Foreign Application Priority Data

Sep. 27, 2019 (JP) .............................. JP2019-177376

(51) Int. Cl.
*B41J 3/407* (2006.01)
*B41J 2/045* (2006.01)

(52) U.S. Cl.
CPC ......... *B41J 3/4078* (2013.01); *B41J 2/04508* (2013.01); *B41J 2/04556* (2013.01); *B41J 2/04586* (2013.01)

(58) Field of Classification Search
CPC ...................................................... B41J 3/4078
See application file for complete search history.

(56) References Cited

U.S. PATENT DOCUMENTS

| 2017/0151780 | A1* | 6/2017 | Masuda ............... B41J 2/04588 |
| 2019/0284419 | A1  | 9/2019 | Kobashi et al. |
| 2019/0284421 | A1  | 9/2019 | Sekiguchi et al. |
| 2020/0101767 | A1  | 4/2020 | Kobashi et al. |
| 2020/0101782 | A1  | 4/2020 | Sekiguchi et al. |

FOREIGN PATENT DOCUMENTS

| JP | 2011-246856 | 12/2011 |
| JP | 2015-150829 | 8/2015  |
| JP | 2017-051952 | 3/2017  |
| JP | 2018-123235 | 8/2018  |

\* cited by examiner

*Primary Examiner* — Scott A Richmond
(74) *Attorney, Agent, or Firm* — Xsensus LLP

(57) ABSTRACT

An image forming apparatus contains an ink having a dynamic surface tension of from 30 to 50 mN/m at a life time of 15 msec at 25 degrees C., a container containing the ink and a head configured to discharge the ink to a fabric including a first fabric containing synthetic fiber in an amount of more than 50 percent by mass and a second fabric containing natural fiber in an amount of 50 percent by mass or greater, the head including a nozzle surface, wherein a first distance between positions of two consecutive droplets of the ink discharged from the head on the first fabric is shorter than a second distance between positions of two consecutive droplets of the ink discharged from the head on the second fabric.

17 Claims, 9 Drawing Sheets

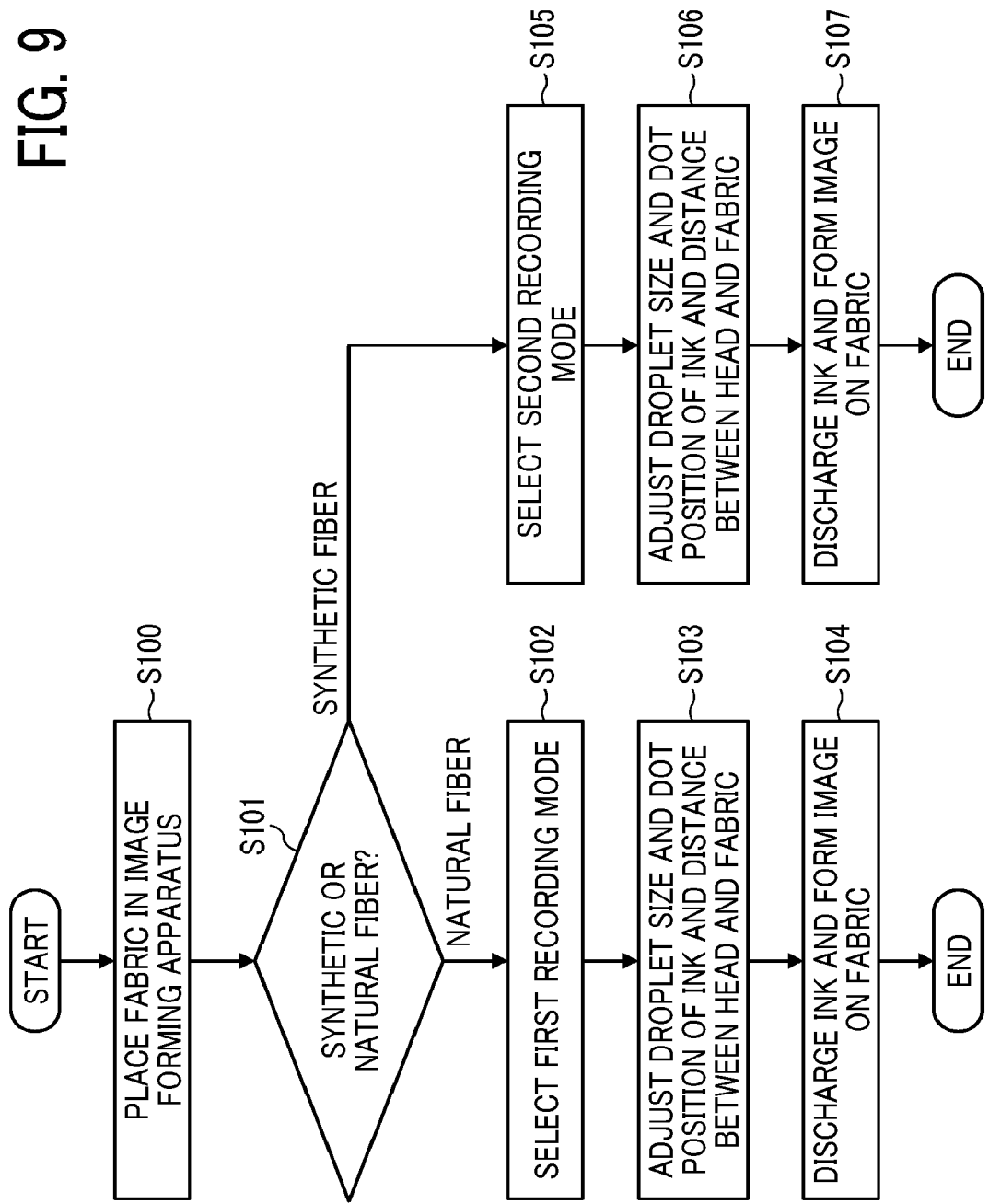

IMAGE FORMING APPARATUS

CROSS-REFERENCE TO RELATED APPLICATIONS

This patent application is based on and claims priority pursuant to 35 U.S.C. § 119 to Japanese Patent Application No. 2019-177376, filed on Sep. 27, 2019 in the Japan Patent Office, the entire disclosure of which is hereby incorporated by reference herein.

BACKGROUND

Technical Field

The present disclosure relates to an image forming apparatus.

Description of the Related Art

Since inkjet printers are relatively quiet, have low running costs, and are capable of printing color images with ease, they are now widely used at home to output digital information.

The need for both conventional cotton and cotton/polyester blended media and sportswear is rapidly increasing in a field referred to as Direct to Garment (DTG) of direct printing on garment such as T-shirts, which requires polyester media compatibility. This trend applies to the entire dyeing field as well as the DTG. For inkjet printers with an unwinding and winding mechanism, the need for inkjet recording capable of producing robust images with excellent coloring on many types of fabrics including cotton and polyester is increasing more and more.

SUMMARY

According to embodiments of the present disclosure, an image forming apparatus is provided which contains an ink having a dynamic surface tension of from 30 to 50 mN/m at a life time of 15 msec at 25 degrees C., a container containing the ink and a head configured to discharge the ink to a fabric including a first fabric containing synthetic fiber in an amount of more than 50 percent by mass and a second fabric containing natural fiber in an amount of 50 percent by mass or greater, the head including a nozzle surface, wherein a first distance between positions of two consecutive droplets of the ink discharged from the head on the first fabric is shorter than a second distance between positions of two consecutive droplets of the ink discharged from the head on the second fabric.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 9 is a control flow chart illustrating image forming according to an embodiment of the present disclosure.

Figure 1:
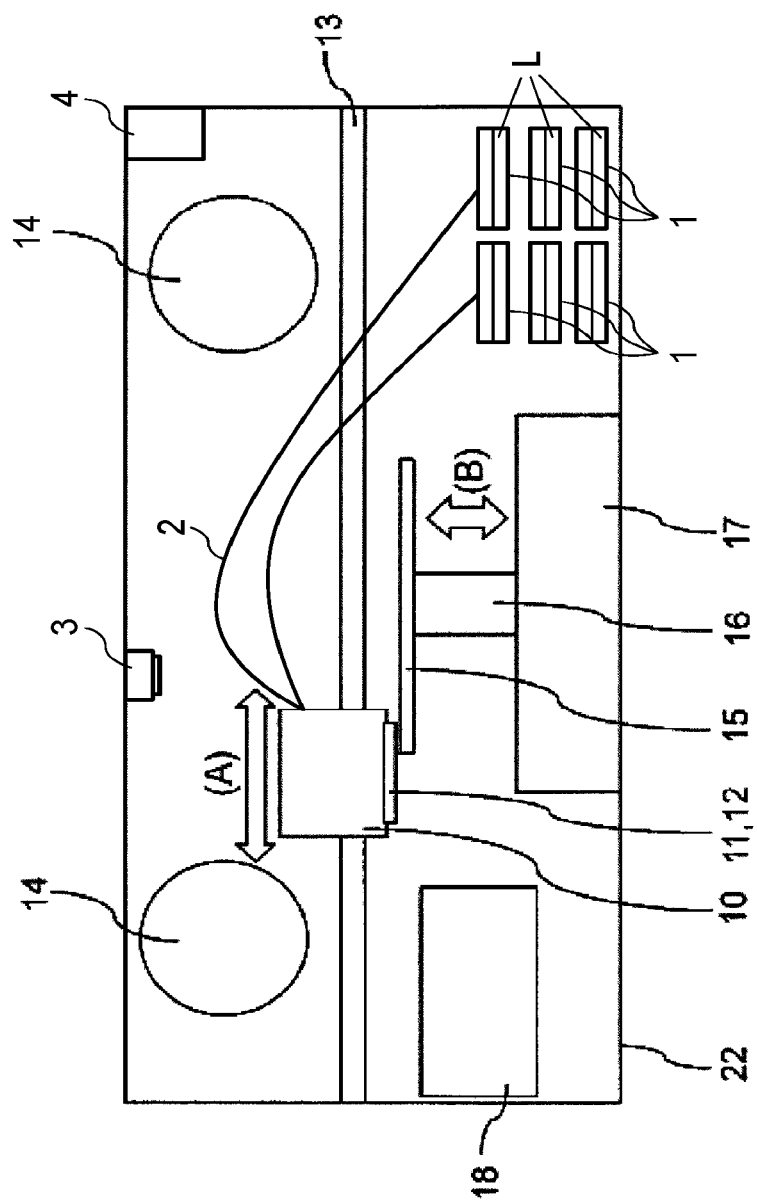
FIG. 1 is a schematic diagram illustrating a cross section in a perpendicular direction to the conveyance direction of a recording medium according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Inkjet recording has been proposed recently for dyeing on knitting materials and materials such as fabric in addition to such home use.

A method has been proposed which includes applying a pre-processing fluid to fabric before dyeing the fabric with ink so that the ink remains on the fabric or a technique has been proposed which controls the viscosity of ink and conveyance speed of fabric depending on the thickness of the fabric so that the ink remains on the fabric.

The level of coloring in natural fiber in the existing inkjet recording is satisfying in the market, however, the ink permeates the inside of fabric containing synthetic fiber so that the coloring significantly deteriorates.

With the device mentioned above, the ink that has reached fabric mainly composed of synthetic resin such as polyester and nylon minimally spreads on the fabric, which degrades evenness of image density.

Developing a method is necessary by which images with high image density and minimal unevenness of image density can be produced on fabrics of different types of fibers, i.e., a synthetic fiber and a natural fiber.

According to the present disclosure, an image forming apparatus is provided which produces images with excellent coloring and minimal unevenness of image density on both of fabric mainly composed of natural fiber and fabric mainly composed of synthetic fiber.

Embodiments of the present disclosure are described in detail below.

Because fabric mainly composed of synthetic fiber has larger voids among the fiber than fabric mainly composed of natural fiber, ink readily permeates the inside of the fabric mainly composed of synthetic fiber. Ink that has reached fiber minimally wets the fiber. pigments fail to cover the fiber in the surface of the fabric mainly composed of synthetic fiber. When ink is applied to such fabric in the same recording mode as for fabric mainly composed of natural fiber, image density lowers and image density becomes uneven.

According to the present disclosure, the distance between positions of two consecutive droplets of the ink discharged from the head on a fabric mainly composed of synthetic fiber is shorter than the distance between positions of two consecutive droplets of the ink discharged from the head on a fabric mainly composed of natural fiber to increase the number of droplets that reach fiber on the surface layer of the fabric mainly composed of synthetic fiber. The image density is increased as a result even on the surface layer of the fabric mainly composed of synthetic fiber, which has large space between the fiber. When the distance (first distance) between the positions of two consecutive droplets of the ink discharged from the head on the fabric mainly composed of synthetic fiber is shorter than the distance (second distance) between the positions of two consecutive droplets of the ink discharged from the head on the fabric mainly composed of natural fiber, the ink readily reaches the fiber present in the surface layer of the fabric mainly composed of synthetic fiber in comparison with the fabric mainly composed of natural fiber, thereby enhancing image density. This short distance between positions on the fabric of two consecutive droplets is suitable to minimize an adverse impact of variation of the position of the ink discharged onto fabric mainly composed of synthetic fiber so that the ink can reach the fabric accurately and evenly and densely, which is suitable to reduce unevenness of image density.

The ink having a dynamic surface tension of 50 mN/m or less at a life time of 15 msec at 25 degrees C. promptly covers fiber in the fabric mainly composed of synthetic resin so that unevenness of image density is minimized for a recording medium having a rough surface such as fabric although the ink droplet readily reaches a position on the fabric having a rough surface deviated from the target position. The ink having a dynamic surface tension of 30 mN/m or greater at a life time of 15 msec at 25 degrees C. minimally permeates to the inside of fabric mainly composed of natural fiber, so that image density remains high.

In the present embodiment, the first distance is shorter than the second distance. It is possible to suitably change such distances by, for example, a set of a first recording mode for fabric mainly composed of natural fiber and a second recording mode for fabric mainly composed of synthetic fiber.

The set of the first recording mode and the second recording mode is described below with reference to the following configurations. Ink is discharged to fabric mainly composed of natural fiber in the first recording mode and to fabric mainly composed of synthetic fiber in the second recording mode. The distance between the positions of two consecutive droplets discharged from the head in the second recording mode is shorter than the distance between the positions of two consecutive droplets discharged from the head in the first recording mode When the first distance in the second recording mode is at least 10 μm shorter than the second distance in the first recording mode, evenness of images is enhanced.

When the first distance in the second recording mode and the second distance in the first recording mode are from 10 to 100 μm, vivid images are produced even on fabric having a different rough surface depending on weaving or knitting.

The droplet of ink discharged from a head to fabric mainly composed of synthetic fiber is larger than that to fabric mainly composed of natural fiber. This large droplet discharged from the head is readily caught in the fiber in the surface of the fabric mainly composed of synthetic fiber, which increases image density. When the droplet discharged in the second recording mode is larger than the droplet discharged in the first recording mode, the image density is enhanced.

The droplet discharged in the second recording mode which is at least 3 pL larger than the droplet discharged in the first recording mode is suitable to enhance the image density.

The droplet of the ink discharged in the first recording mode or the second recording mode having a volume of from 5 to 30 pL is suitable to produce images with satisfying image density and vividness on fabric having a high ink absorbency.

When the distance (first gap) between the head and the fabric in the second recording mode is shorter than the distance (second gap) between the head and the fabric in the first recording mode, the position of a droplet on fabric mainly composed of synthetic fiber is more accurate than that of a droplet on fabric mainly composed of natural fiber. The evenness of image density is enhanced as a result. The distance between the head and the fabric means the gap between the nozzle surface of the head and the fabric unless otherwise specified. Nozzles are formed on the nozzle surface in the head.

When the first gap is at least 1 mm shorter than the second gap, the evenness of image density is enhanced.

When the first gap and the second gap are from 0.5 to 5 mm, the discharging reliability and evenness of image density are enhanced.

The image forming apparatus of the present embodiment may optionally have a fabric holding member (e.g., platen) to hold fabric. When the distance (third gap) between the nozzle surface and the fabric holding member in the second recording mode is shorter than the distance (fourth gap) between the nozzle surface and the fabric holding member in the first recording mode, the evenness of image density is enhanced.

An ink having a dynamic surface tension of from 32 to 45 mN/m at a life time of 15 msec at 25 degrees C. enhances the image density on fabric mainly composed of natural fiber and the evenness of image density on fabric mainly composed of synthetic fiber.

Fabric Mainly Composed of Natural Fiber

The fabric mainly composed of natural fiber in the present disclosure contains natural fiber in an amount of 50 percent by mass or greater. The type of the natural fiber includes materials such as cotton, hemp, silk, and wool, but is not limited thereto.

Fabric Mainly Composed of Synthetic Fiber

The fabric mainly composed of synthetic fiber in the present disclosure contains synthetic fiber in an amount of more than 50 percent by mass or greater. The type of the synthetic fiber includes materials such as polyester, nylon, and rayon, but is not limited thereto.

The fabric mainly composed of natural fiber has a basis weight of from, for example, from 80 to 250 g/m$^2$, and preferably from 100 to 220 g/m$^2$.

The fabric mainly composed of synthetic fiber has a basis weight of from, for example, from 60 to 230 g/m$^2$ and preferably from 80 to 200 g/m$^2$.

One embodiment of the present disclosure is described.

There are at least a first recording mode for fabric mainly composed of natural fiber and a second recording mode for fabric mainly composed of synthetic fiber. In the present embodiment. The image forming apparatus can switch between the first recording mode and the second recording mode.

The image forming apparatus has a default value for the recording mode. Either of the first recording mode or the second recording mode can be set as the default. The default is set on the first recording mode in the following example.

The recording mode is changed between the first recording mode and the second recording mode depending on the composition (type, component) of a recording medium (fabric) as a printing target. The image forming apparatus may include a detector to detect the composition of the fabric. Alternatively, a user can input the composition of the fabric to be used directly or press a button to select from the compositions set in the apparatus in advance. It is possible to directly select the first recording mode or the second recording mode instead of inputting the composition of the fabric. The image forming apparatus may have an input unit such as a touch panel from which a user can input the type and the components of fabric.

In the present embodiment, the first distance is changed to be shorter when the second recording mode is selected in the recording mode selection screen.

The distance between two consecutive ink droplets is the one between the centers of the adjacent two ink dots.

"Changed to be shorter" between the two consecutive ink droplets on the fabric means changing the settings to make the distance between the two adjacent ink dots shorter. The distance can be changed by utilizing known methods. The distance can be changed by changing drive frequency of a head, slowing down the scanning speed of a carriage carrying a head, or decreasing the feeding amount of a recording medium.

Another embodiment of the present disclosure is described.

In this embodiment, the discharging speed of ink discharged from a head to fabric is changed to be slower when the second recording mode is selected in the recording mode selection screen. The discharging speed can be changed by utilizing known methods. The discharging head can be changed by changing the drive frequency of a head or changing the voltage applied to a piezoelectric member.

In this embodiment, images with good coloring and even image density are printed on fabric mainly composed of synthetic fiber.

Next, yet another embodiment of the present disclosure is described.

The droplet of ink discharged from the head to fabric in the second recording mode is changed to be larger than the droplet of ink in the first recording mode in this embodiment. The droplet size can be changed by utilizing known methods. For piezoelectric heads, it is possible to increase a voltage applied to a head, increase the amount of the head drawn in, or merge ink droplets. Thermal heads can also be used and controlled by known methods.

The droplet size of ink can be measured by shooting a droplet immediately before it reaches fabric from multiple directions by cameras to calculate the volume of the droplet. Ink droplets are shot after the ink droplets are merged.

The droplet size of ink can be measured as follows. Images are output onto a non-permeable medium such as film or silicon oil and the mass before and after the output of the images are measured. The obtained mass change is divided by the number of droplets discharged to obtain the mass per droplet. The density of the ink is calculated and the diameter of a single droplet is calculated based on the formula of the volume of the sphere by regarding the ink droplet as a sphere.

Next, a still another embodiment of the present disclosure is described.

In this embodiment, the distance between a head and fabric as a recording medium is changed to be shorter for the second recording mode. This distance can be changed by utilizing known methods. The distance can be changed by a device for elevating the platen holding a recording medium or lowering the carriage carrying a head.

The distance between the head and the recording medium can be obtained by measuring the distance between the nozzle surface of the head and the surface of the recording medium on the side facing the nozzle surface. It is also possible to obtain the distance based on the thickness of a recording medium, the ascent length of a platen, and the descent length of a carriage. In this embodiment, the distance between the nozzle surface and the recording medium relate to each other. As the distance between the nozzle surface and the recording medium decreases, the distance between the nozzle surface and the platen decreases. Conversely, as the distance between the nozzle surface and the recording medium increases, the distance between the nozzle surface and the platen increases.

FIG. 1 is a diagram illustrating an example of the image forming apparatus of the present disclosure. In FIG. 1, the recording medium is conveyed in the depth direction (or the front direction) of the drawing surface. FIG. 1 is a schematic diagram illustrating a cross section of the image forming apparatus in the direction perpendicular to the conveyance direction of the recording medium.

In FIG. 1, an image forming apparatus 22 includes a carriage 10, a first head 11, a second head 12, a carriage scanning rail 13, an exhaust unit 14, a platen 15 (fabric holder), a support member 16, a platen carriage 17, a maintenance unit 18, a container 1 such as a carriage that contains liquid (liquid supply container), a tube 2 as a liquid supply device to supply the head to each head from the container 1, a detector 3 to detect the type and/or the composition of a fabric (recording medium), an input unit 4, and L as liquid (ink) contained in the container.

The platen 15 holds the fabric and the size of the platen 15 is changeable. The platen 15 is supported by the support member 16. The platen 15 in the present embodiment elevates up and down in the direction B in FIG. 1. Due to this configuration, the distance between the nozzle surface and the platen and the distance between the nozzle surface and the fabric can be changed.

The platen carriage 17 moves the platen 15. It can move the platen 15 in the vertical direction (along the direction indicated by the arrow B) and in the conveyance direction of the recording medium.

The maintenance unit 18 maintains the heads 11 and 12 and includes members such as a cap, a suction pump, and a dummy discharge receiver.

The carriage 10 is a housing including the first head 11 and the second head 12. It also includes members such as an encoder sensor, a moving belt, and an elevating mechanism. This elevation mechanism moves the carriage 10 up and down in the direction B in FIG. 1 so that the distance between the nozzle surface and the platen and the distance between the nozzle surface and the recording medium can be changed.

The carriage 10 moves on the carriage scanning rail 13 in the direction perpendicular to the conveyance direction of the recording medium.

Note that the direction perpendicular to the conveyance direction of the recording medium is also referred to as the main scanning direction, which is indicated by the arrow A in FIG. 1. In addition, the conveyance direction of the recording medium is also referred to as the sub-scanning direction. The main scanning direction and the sub-scanning direction are orthogonal to each other.

The image forming apparatus 22 may optionally include the first head 11 to discharge a pre-processing fluid. The second head 12 discharges the ink for use in the present disclosure. The first head 11 is disposed upstream of the second head in the conveyance direction of the recording medium. When the first head 11 and the second head 12 are described without a distinction, they are simply referred to as heads.

The exhaust unit 14 exhausts the gas in the image forming apparatus 22 outside. For example, it may include a fan such as a motor-driven fan. The container 1 contains an ink or a pre-processing fluid. The ink includes a color ink such as black ink, a cyan ink, a magenta ink, a yellow ink, or a white ink. The liquid contained in the container 1 is sent through to the tube 2 to each corresponding head.

Figure 2:
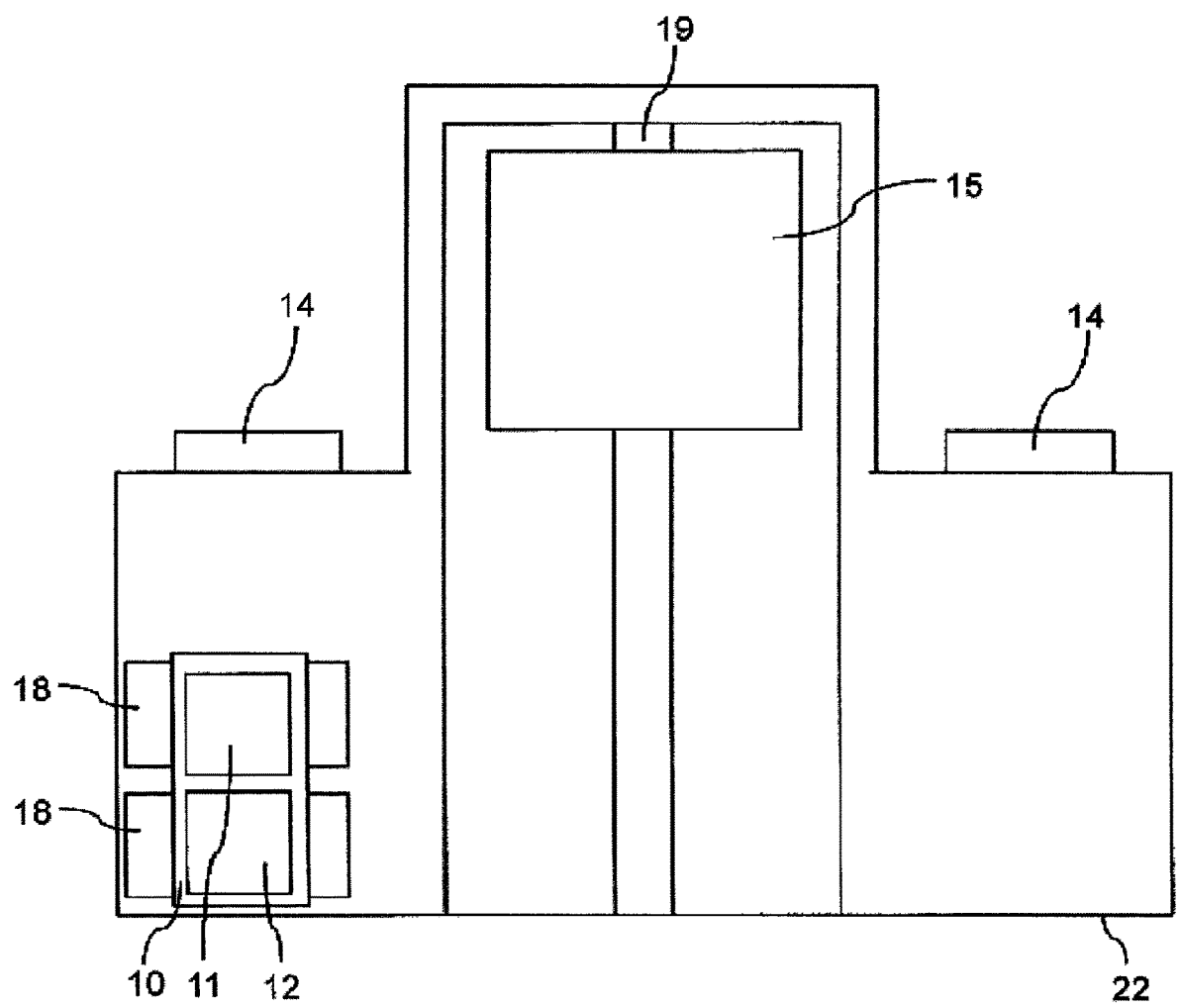
FIG. 2 is a schematic diagram illustrating the image forming apparatus according to an embodiment of the present disclosure.

FIG. 2 is a schematic diagram illustrating a planar view of the image forming apparatus 22 of the present embodiment. The carriage 10 and the platen 15 are not moving but stand still.

As illustrated in FIG. 2, the carriage 10 includes the first head 11 and the second head 12. In FIG. 2, the carriage scanning rail 13 is omitted.

The platen 15 moves along the platen moving rail 19.

Figure 3:
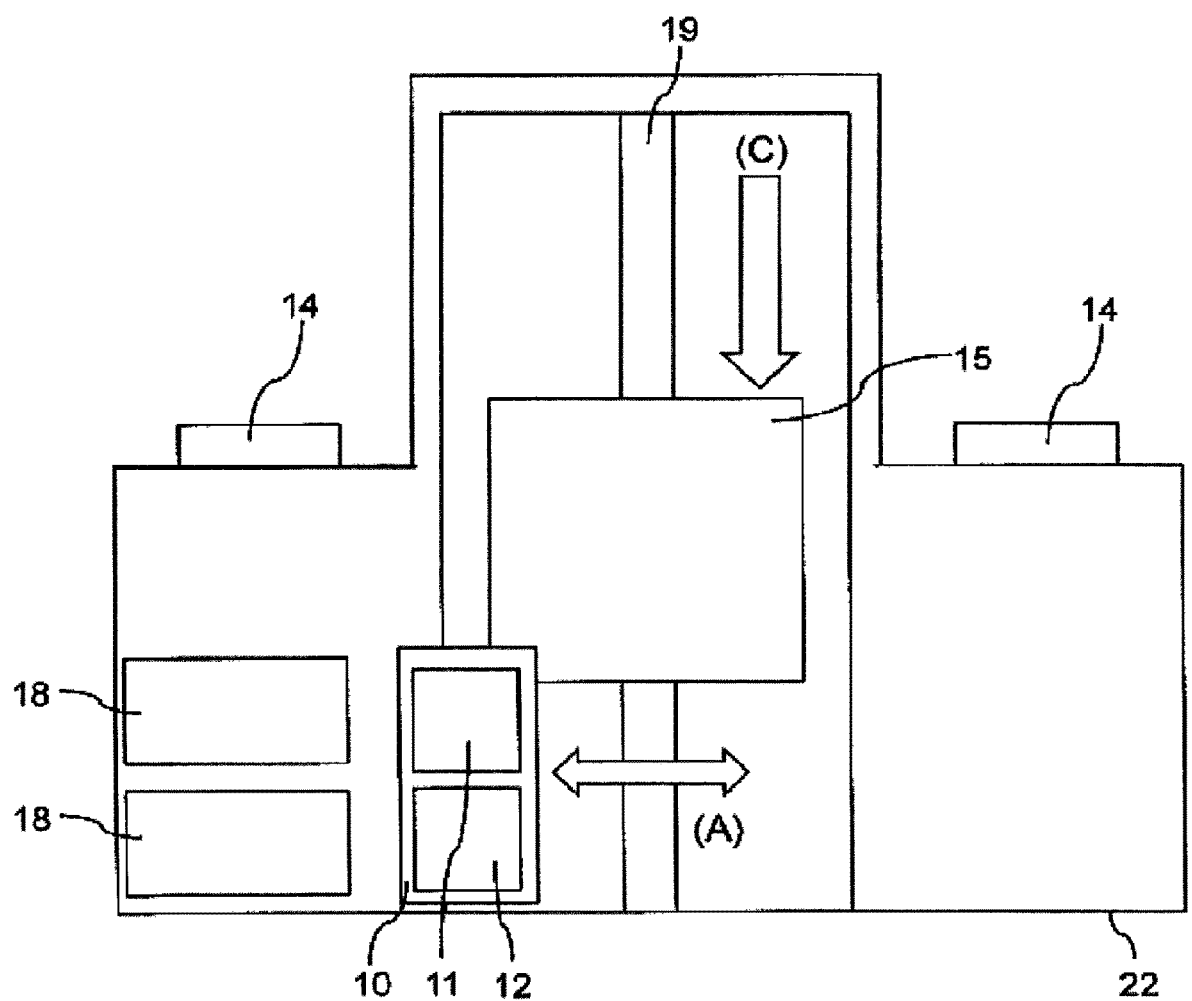
FIG. 3 is another schematic diagram illustrating an embodiment of the image forming apparatus according to an embodiment of the present disclosure.

FIG. 3 is a schematic diagram illustrating another planar view of the image forming apparatus of the present embodiment. The carriage 10 and the platen 15 illustrated in FIG. 2 do not stand still but are moving.

As illustrated in FIG. 3, the platen 15 moves along the platen moving rail 19 in the direction indicated by the arrow C in FIG. 3. Since the recording medium is conveyed while held on the platen 15, the moving direction of the platen 15 coincides with the conveyance direction of the recording medium.

As illustrated in FIG. 3, the second head 12 is disposed downstream of the first head 11 in the conveyance direction of the recording medium.

The heads 11 and 12 discharge liquid while the carriage 10 scans in the main scanning direction (direction A in FIG. 3) when the platen 15 moves in the direction indicated by the arrow C and reaches the position near the carriage 10. At this point, the first head 11 discharges the pre-processing fluid toward the recording medium first and then the second head 12 discharges the ink toward the recording medium.

Figure 4:
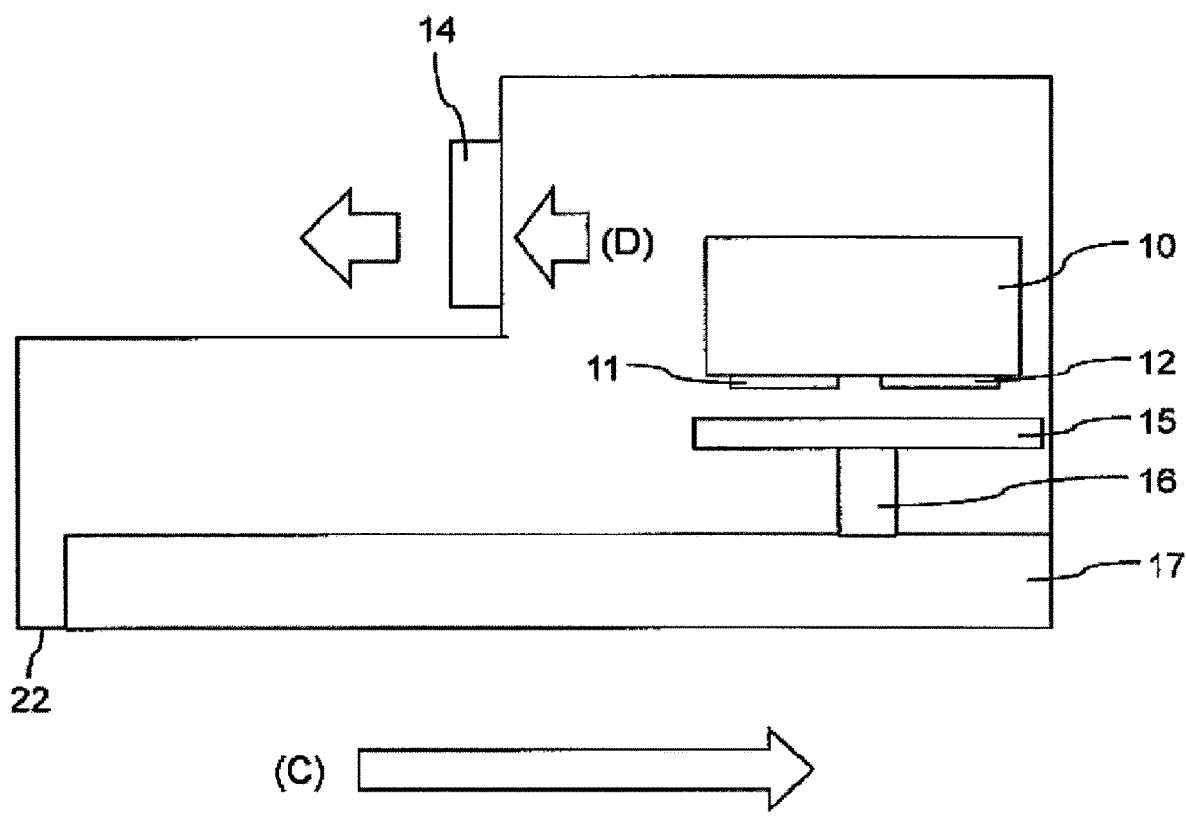
FIG. 4 is a schematic diagram illustrating a side view of the image forming apparatus according to an embodiment of the present disclosure.
Figure 5:
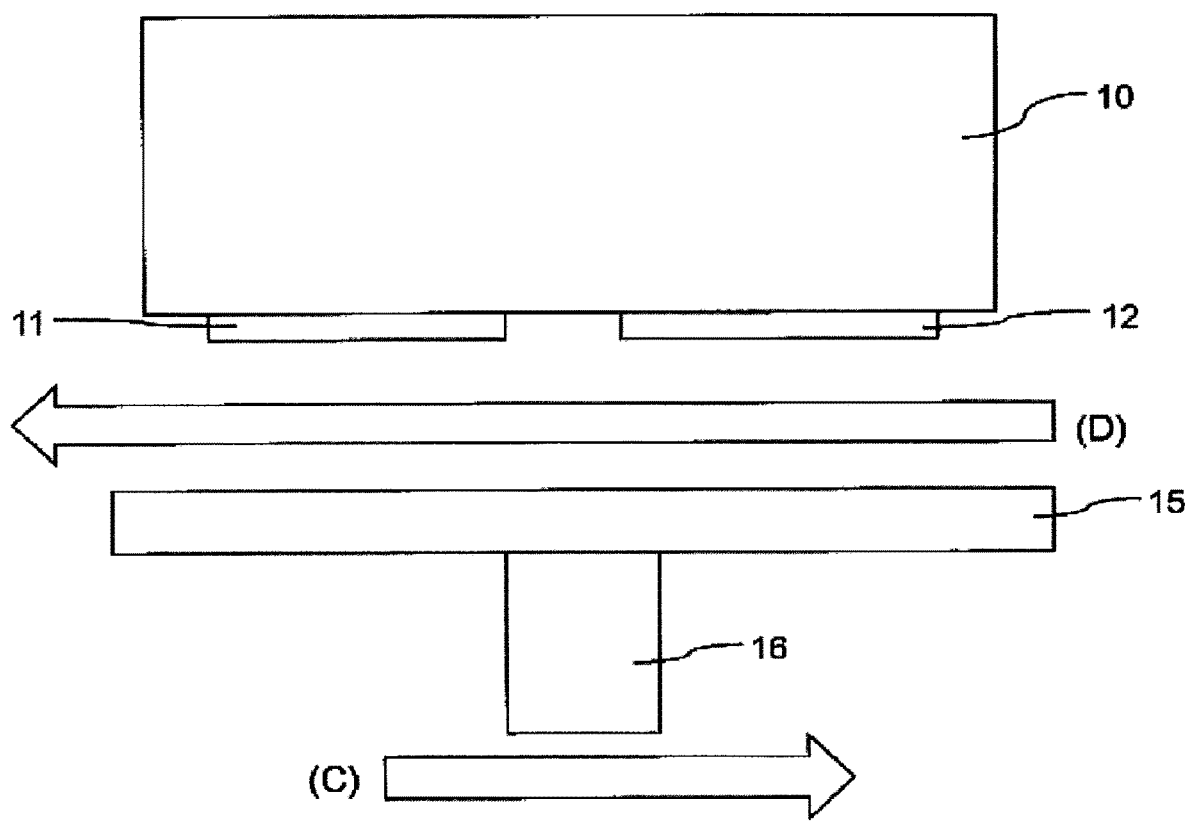
FIG. 5 is a schematic diagram illustrating another side view of the image forming apparatus according to an embodiment of the present disclosure.

FIG. 4 is a schematic diagram illustrating a side view of the image forming apparatus of the present embodiment. FIG. 5 is a diagram illustrating an enlarged view of a part of the image forming apparatus illustrated in FIG. 4.

The exhaust unit 14 of the present embodiment is preferably disposed in such a manner that the gas between the first head 11 and the platen 15 (or the recording medium) flows upstream in the conveyance direction of the recording medium. Further, the gas inside the image forming apparatus 22 is exhausted to the outside as indicated by the arrow D in FIG. 4.

Due to this configuration, as illustrated in FIG. 5, the gas in the space between the platen 15 and each head flows from the second head 12 to the first head 11 (the direction indicated by the arrow D in FIG. 5). In other words, the gas between the first head 11 and the platen 15 (or the recording medium) flows upstream in the conveyance direction of the recording medium.

Due to this gas flow, the mist of the pre-processing fluid rising around the first head 11 does not readily reach the second head 12, which prevents the mist of the pre-processing fluid from adhering to the nozzle forming surface of the second head 12 so that the ink does not agglomerate. Due to this prevention of agglomeration of the ink, discharging reliability ameliorates.

As illustrated in FIG. 5, the gas flow in the space between the second head 12 and the platen 15 (or the recording medium) may flow upstream in the conveyance direction of the recording medium.

Figure 6:
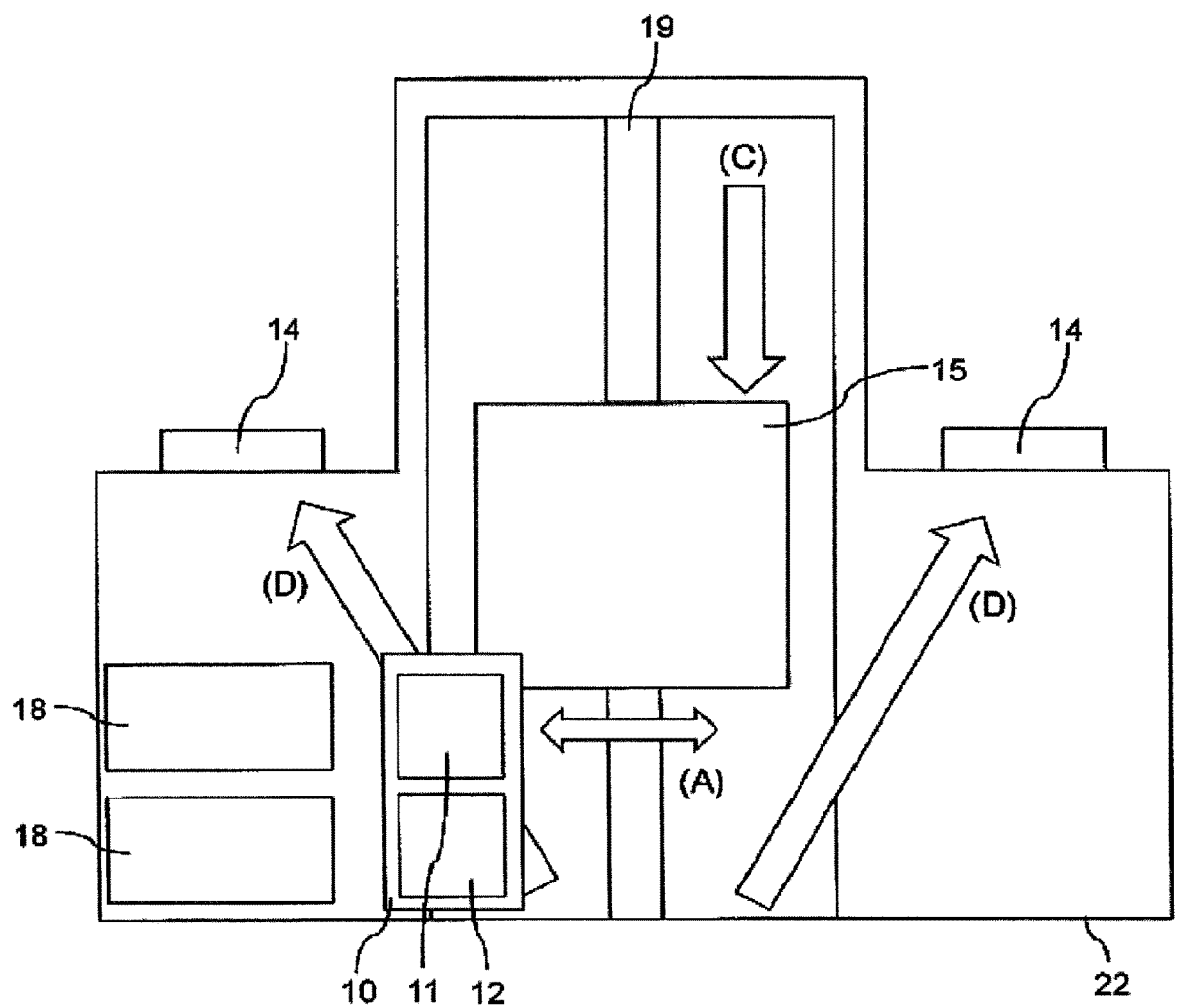
FIG. 6 is another schematic diagram illustrating an embodiment of the image forming apparatus according to an embodiment of the present disclosure.

FIG. 6 is a schematic diagram illustrating another planar view of the present embodiment. In FIG. 6, the gas flow indicated by the arrow D is added to the planar view illustrated in FIG. 3.

As illustrated in FIG. 6, the image forming apparatus for discharging liquid of the present embodiment has a plurality of exhaust units 14. The plurality of exhaust units 14 in the present embodiment are all disposed upstream of the first head 11 in the conveyance direction (indicated by the arrow C) of the recording medium.

Due to this configuration, the gas flows upstream of the conveyance direction of the recording medium, thereby demonstrating the above-described effects.

Note that it is possible to fix the position of the recording medium while moving the carriage 10 upstream and downstream. In this case, upstream and downstream in the conveyance direction of the recording medium in the present embodiment may be considered as the conveyance direction relative to the heads 11 and 12. The upstream of the conveyance direction of the recording medium corresponds to the downstream in the conveyance direction of the heads 11 and 12 and the downstream in the conveyance direction of the recording medium corresponds to the upstream in the conveyance direction of the heads 11 and 12.

Figure 7:
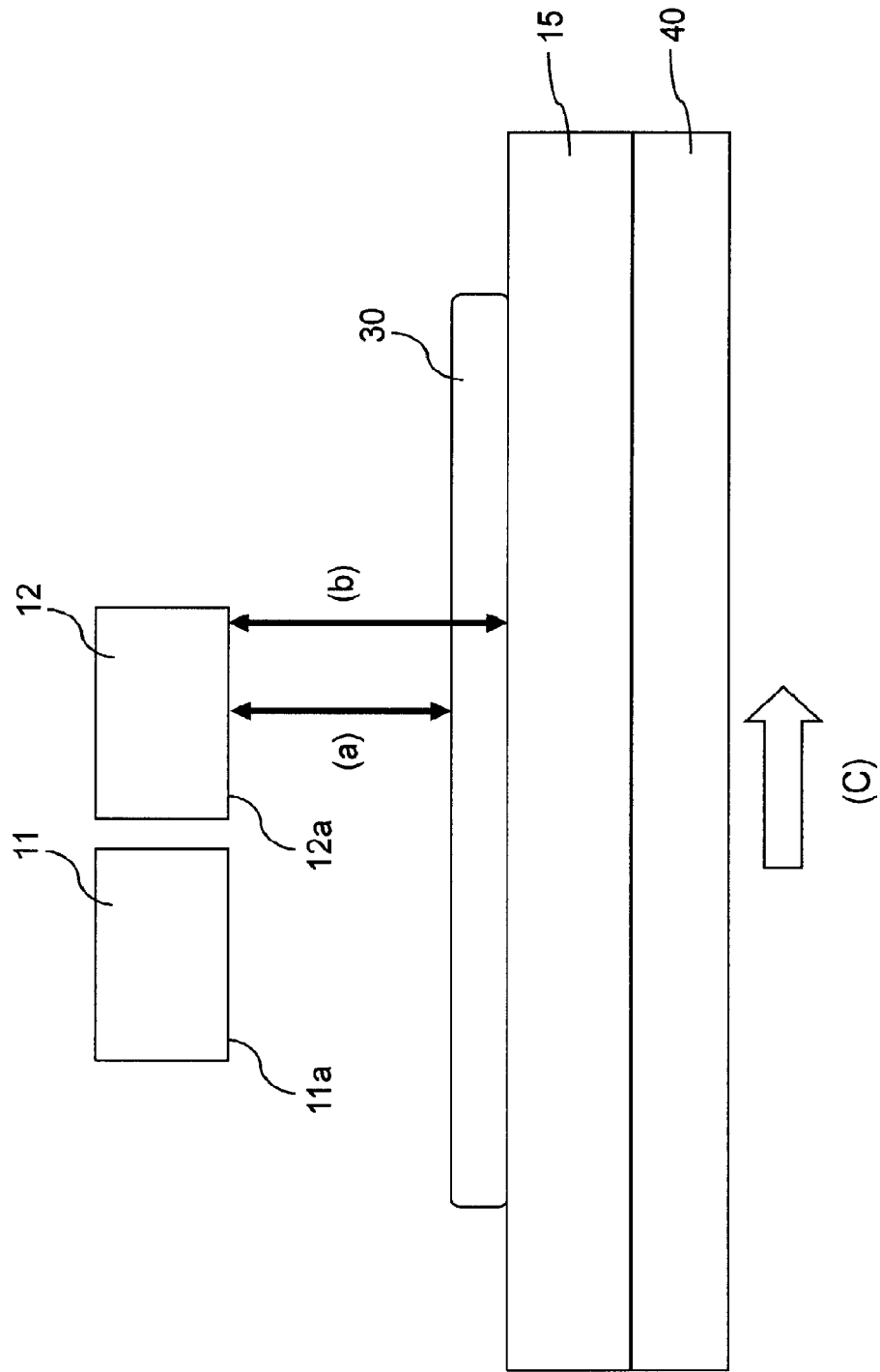
FIG. 7 is a schematic diagram illustrating a view of part of the image forming apparatus according to an embodiment of the present disclosure.

Next, FIG. 7 is a schematic diagram illustrating a part of the image forming apparatus of the present embodiment. In FIG. 7, the image forming apparatus 22 includes the first head 11 for discharging the pre-processing fluid from the nozzles, the second head 12 for discharging the ink from the nozzles, the platen 15 (fabric medium holding unit) for holding a recording medium 30, and a heating device 40 for heating the recording medium 30.

The image forming apparatus 22 also includes a nozzle surface 11a of the first head 11 and a nozzle surface 12a of the second head 12. The distance between the nozzle surface 12a and the recording medium 30 is indicated by the arrow a. The distance between the nozzle surface 12a and the platen 15 is indicated by the arrow b. The arrow a is also referred to as a first or second gap and the arrow b is also referred to as a third or fourth gap. These gaps change according to the elevation of the platen and the carriage.

Figure 8:
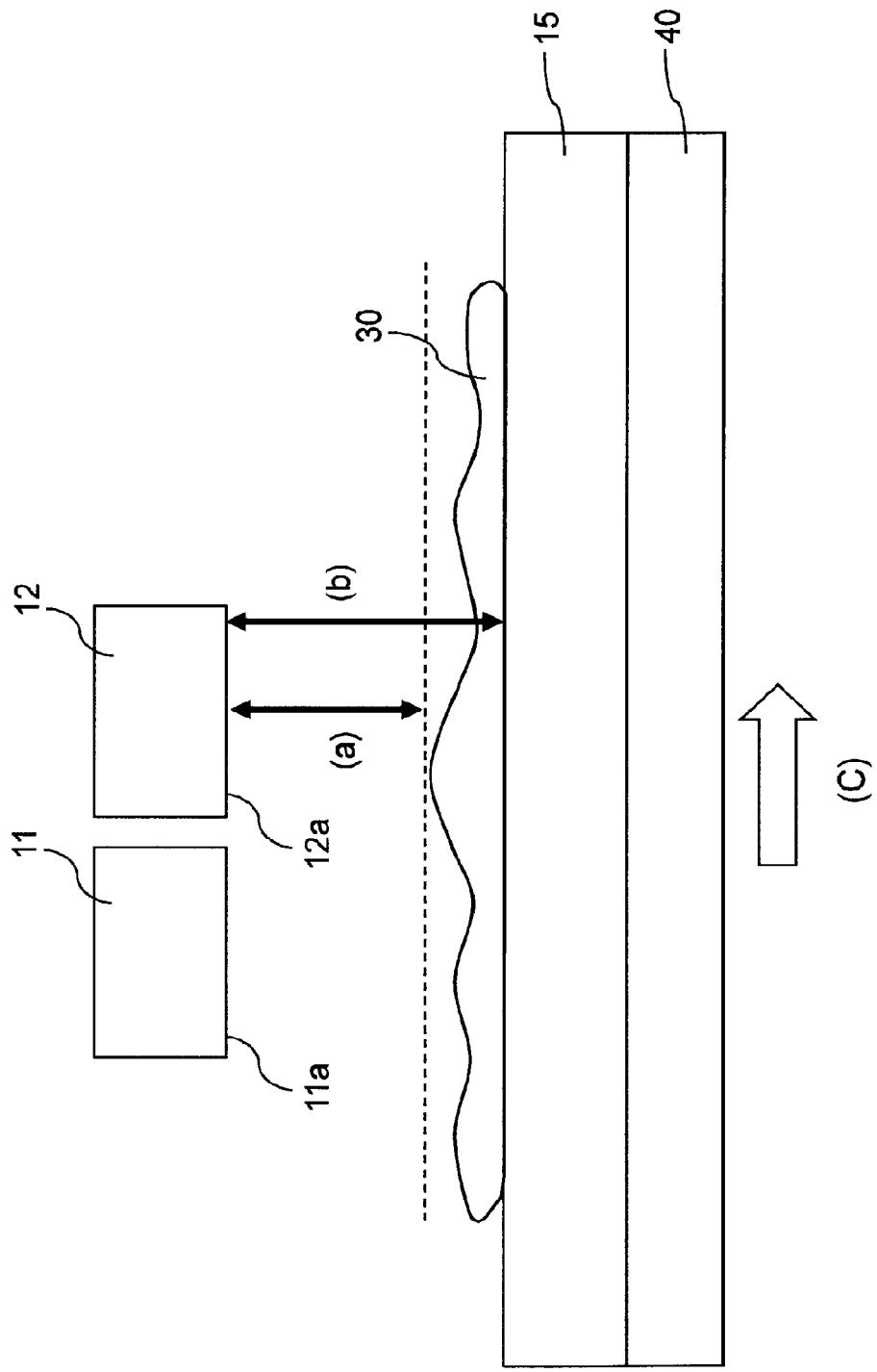
FIG. 8 is another schematic diagram illustrating a view of part of the image forming apparatus according to an embodiment of the present disclosure.

Next, FIG. 8 is a schematic diagram illustrating a part of the image forming apparatus of the present embodiment. FIG. 8 is a diagram similar to FIG. 7. As illustrated in FIG. 8, fabric as a recording medium waves depending on properties of the texture or material. The highest portion of the fabric on the nozzle surface 12a side and the gap between the highest portion and the nozzle surface 12a are measured to obtain the first gap. Note that the first gap is measured excluding the fluff portion. In such a case, the fabric is smoothed by a pressing member before measurement.

The thickness of the recording medium is preferably 3.5 mm or less. Such treatment prevents deterioration of positional accuracy of dots caused by fluff of fabric and non-discharging caused by thermal conduction to nozzles from a rising part of the heated portion of the recording medium.

Note that the thickness of the recording medium is measured excluding the fluff portion. The recording medium is smoothed by a pressing member before measurement.

The image forming apparatus of the present embodiment has a head for discharging an ink having a dynamic surface tension of from 30 to 50 mN/m at a life time of 15 msec at 25 degrees C. The first distance is shorter than the second distance in this case as described above.

FIG. 9 is a flow chart illustrating image forming in the present embodiment.

This flow chart shows how to determine the type of fabric based on the information of fabric input into the input unit in an image forming apparatus.

Place fabric in an image forming apparatus (S100).

Determine whether the fabric is mainly composed of natural or synthetic fiber based on the information about the fabric input into the input unit (S101).

For the natural fiber fabric, the first recording mode is selected (S102), the droplet size of ink and the distance between dots and/or the distance between the head and the fabric is adjusted (S103), and the ink is discharged to the fabric to form an image (S104).

The second recording mode is selected (S105) for synthetic fiber, the droplet size of ink and the distance between dots and/or the distance between the head and the fabric is adjusted (S106), and the ink is discharged to the fabric to form an image (S107).

Although the type of fabric is determined based on the information about the fabric input into the input unit in the image forming apparatus and the information such as the distance between the head and the fabric is changed, the determination of the type is not limited thereto. It is possible to provide a detector in an image forming apparatus to determine the composition of the fabric. It is possible to change the distance between the head and the fabric based on the composition of fabric detected by the detector. Such detectors are known to public and man in the art can select a suitable one.

The ink for use in the present disclosure is described.

Ink

The organic solvent, water, coloring material, resin, and additive for use in the ink are described below.

Organic Solvent

There is no specific limitation to the organic solvent for use in the present disclosure. For example, a water-soluble organic solvent can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying at the same time.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The proportion of the organic solvent in the ink has no particular limit and can be suitably selected to suit to a particular application.

In terms of drying and discharging reliability of the ink, the proportion is preferably from 10 to 60 percent by mass and more preferably from 20 to 60 percent by mass.

Water

The proportion of water of the ink is not particularly limited and can be suitably selected to suit to a particular application. For example, in terms of enhancing the drying and discharging reliability of the ink, the proportion is preferably from 10 to 90 percent by mass and more preferably from 20 to 60 percent by mass.

Coloring Material

The coloring material has no particular limitation and includes materials such as a pigment and a dye.

The pigment includes an inorganic pigment or an organic pigment. These can be used alone or in combination. In addition, a mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

The ink is obtained by introducing a hydrophilic functional group into a pigment to prepare a self-dispersible pigment, coating the surface of a pigment with a resin followed by dispersion, or using a dispersant to disperse a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a resin by coating the surface thereof is to encapsulate a pigment in a microcapsule to make it disperse in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

When a dispersant is used, a known dispersant having a small or large molecular weight represented by a surfactant is used.

It is possible to select an anionic surfactant, a cationic surfactant, a nonionic surfactant, an amphoteric surfactant, or others depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be analyzed using a particle size analyzer (Nanotrac Wave-UT151, manufactured by MicrotracBEL Corp).

The proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with an instrument such as filter and a centrifuge to remove coarse particles followed by deaerateing.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. The resin particle can be used alone or in combination.

The mean volume diameter (i.e., volume average particle diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to achieve good fixability and image robustness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of the ink, it is preferably from 1 to 30 percent by mass and more preferably from 5 to 20 percent by mass of the total amount of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes particles such as resin particles and pigment particles.

The particle diameter can be measured by using a particle size analyzer (Nanotrac Wave-UT151, manufactured by MicrotracBEL Corp).

Additive

The ink may further optionally include additives such as a surfactant, a defoaming agent, a preservative and fungicide, a corrosion inhibitor, and a pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application.

Of these, surfactants not decomposable in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. In particular, silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carbonic acid compounds include, but are not limited to, perfluoroalkyl carbonic acid and salts of perfluoroalkyl carbonic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethyl siloxane, one-distal-end-modified polydimethyl siloxane, and side-chain-both-distal-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitable synthetic surfactant and any product available on the market is suitable. Products are available from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

Chemical Formula S-1

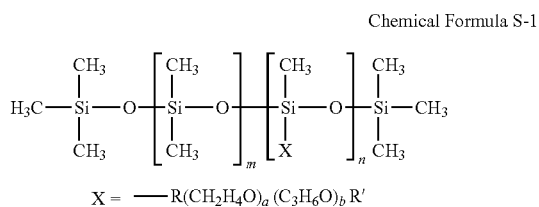

X = —R(CH$_2$H$_4$O)$_a$(C$_3$H$_6$O)$_b$R'

In Chemical Formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical Formula F-1 or Chemical Formula F-2 is more preferable.

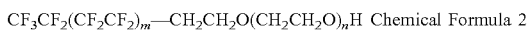
CF$_3$CF$_2$(CF$_2$CF$_2$)$_m$—CH$_2$CH$_2$O(CH$_2$CH$_2$O)$_n$H  Chemical Formula 2

In the Chemical Formula F-1, "m" is preferably 0 or an integer of from 1 to 10 and "n" is preferably 0 or an integer of from 1 to 40.

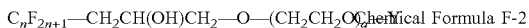
C$_n$F$_{2n+1}$—CH$_2$CH(OH)CH$_2$—O—(CH$_2$CH$_2$O)$_a$—Y  Chemical Formula F-2

In the compound represented by the chemical Formula F-2, Y represents H or C$_m$F$_{2m+1}$, where m represents an integer of from 1 to 6, or CH$_2$CH(OH)CH$_2$—C$_m$F$_{2m+1}$, where m represents an integer of from 4 to 6, or C$_p$H$_{2p+1}$, where p is an integer of from 1 to 19. n represents an integer of from 1 to 6. a represents an integer of from 4 to 14.

The fluorochemical surfactant is commercially available. Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass to achieve excellent wettability and discharging stability and improve image quality.

Defoaming Agent

The defoaming agent has no particular limit and examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Examples are acid sulfites and sodium thiosulfates.

pH regulator

The pH regulator has no particular limit as long as it can control pH to be not lower than 7. Specific examples include, but are not limited to, amines such as diethanol amine and triethanol amine.

Properties of the ink are not particularly limited and can be suitably selected to suit to a particular application. For example, viscosity, surface tension, and pH are preferable in the following ranges.

Viscosity of the ink at 25 degrees C. is preferably from 5 to 30 mPa·s and more preferably from 5 to 25 mPa·s because print density and text quality improve and good dischargeability is demonstrated. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Rotational frequency: 50 rotations per minute (rpm)
25 degrees C.
Measuring time: three minutes.

The surface tension of the ink is preferably 35 mN/m or less and more preferably 32 mN/m or less at 25 degrees C. because the ink suitably levels on a recording medium and the drying time of the ink is shortened.

pH of the ink is preferably from 7 to 12 and more preferably from 8 to 11 in terms of prevention of corrosion of metal material in contact with liquid.

Pre-Processing Fluid

The pre-processing fluid includes a flocculant, an organic solvent, water, and optional materials such as a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in the ink. Also, other material for use in known processing fluid can be used.

The type of the flocculant is not particularly limited. For example, water-soluble cationic polymers, acids, and multivalent metal salts are suitable.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

The ink for use in the present disclosure is designed to have a dynamic surface tension of from 30 to 50 mN/m at a life time of 15 msec at 25 degrees C. The dynamic surface tension can be controlled by changing the type and the amount of a surfactant added to the ink.

Dynamic surface tension can be measured by known methods. It is preferable to employ the maximum bubble pressure technique in the present disclosure. Instruments employing the maximum bubble pressure technique for measuring dynamic surface tension instrument are procurable. A specific example is DynoTester (manufactured by SITA Messtechnik GmbH).

In maximum bubble pressure technique, the surface tension is obtained from the maximum pressure required to discharge the air bubbles from the front portion of a probe immersed in a target liquid (ink).

The maximum pressure is shown when the radius of the air bubbles is equal to the radius of the front portion of the probe, and the dynamic surface tension σ of the ink is obtained by the following equation.

$$\sigma = (\Delta P \cdot r)/2$$

In the equation, r represents the radius of the front portion of a probe and ΔP represents the difference between the maximum and minimum pressure applied to an air bubble.

The life time here means, in the maximum bubble pressure technique, the time between when a new surface is formed after an air bubble is released from a probe and when the next maximum bubble pressure is shown.

Although the fabric mainly composed of natural fiber and the fabric mainly composed of synthetic fiber are used in the embodiments described above, the present disclosure includes the following embodiment.

The image forming apparatus of the present embodiment includes an ink having a dynamic surface tension of from 30 to 50 mN/m at a life time of 15 msec at 25 degrees C.; a container containing the ink and a head configured to discharge the ink, wherein the distance between the positions of two consecutive droplets of the ink discharged from the head on a fabric containing synthetic fiber is shorter than the distance between the positions of two consecutive droplets of the ink discharged from the head on a fabric made of natural fiber alone.

The fabric made of natural fiber contains a natural fiber at 100 percent by mass. The present embodiment may have the first recording mode and the second recording mode. The image forming apparatus discharges the ink to the fabric made of natural fiber in the first recording mode mentioned above and to the fabric containing synthetic fiber in the second recording mode. Images with high level of coloring and uneven image density are created on both the fabric made of natural fiber and the fabric containing synthetic fiber in the present embodiment. The configurations in the embodiments described above and preferable configurations are applicable to the present embodiment and the descriptions thereof are omitted.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto. Parts represents parts by mass.

Preparation of Black Pigment Dispersion

After the following recipe was preliminarily mixed, the mixture was subjected to circulation dispersion for seven hours with a disk type bead mill (KDL type, media: zirconia ball having a diameter of 0.3 mm, manufactured by SHINMARU ENTERPRISES CORPORATION) to obtain a black pigment dispersion (pigment concentration: 15 percent by mass).

Carbon black pigment (Product: Monarch 800, manufactured by Cabot Corporation): 15 parts Anionic surfactant (Pionine A-51-B, manufactured by TAKEMOTO OIL & FAT Co., Ltd.): 2 parts Deionized water: 83 parts Manufacturing of Liquid Dispersion of Resin Particle A liquid dispersion of resin particle was obtained in the following manner.

First, 50 parts of polycarbonate (T5651, manufactured by Asahi Kasei Corporation), 3 parts of dimethylol propionic acid, 24 parts of isophorone diisocyanate, and 42 parts of acetone dehydrated by a molecular sieve were placed in a 500 mL separable flask equipped with a stirrer, a thermometer, and an efflux tube followed by heating to 70 degrees C. in a nitrogen atmosphere. Thereafter, 200 ppm of tin 2-ethyl hexanoate was added to the obtained mixture to allow reaction at 70 degrees C. for 4 hours while the concentration of isocyanate in the system was measured. The temperature in the system was lowered to 40 degrees C. and 2 parts of triethyl amine was added. A total of 140 parts of deionized water was added while the entire was stirred at 300 rpm. Subsequent to one hour stirring, 2 parts of isophorone diamine was added followed by stirring for 4 hours. Thereafter, the resulting liquid was cooled down to room temperature followed by distilling away the solvent by an evaporator. Deionized water was added such that the solid portion was 30 percent to obtain a liquid dispersion of resin particle.

Preparation of Pre-Processing Fluid

The following recipe was mixed and stirred for one hour. The resulting mixture was filtered with a 1.2 μm cellulose acetate membrane filter under a pressure to obtain a pre-processing fluid.

Propylene glycol: 25 parts

Triethylene glycol: 5 parts

Wet 270 (manufactured by Evonik): 0.5 parts

BYK 348 (manufactured by BYK-Chemie GmbH: 0.5 parts

Envirogem AD01 (manufactured by Air Products and Chemicals, Inc.): 0.5 parts

PROXEL LV: Benzisothiazolin-3-one solution (manufactured by LONZA Japan): 0.3 parts
Magnesium chloride hexahydrate: 5 parts
Deionized water: balance (100 parts in total)
Preparation of Black Ink Each component was mixed at the formulation (percent by mass) shown in Table 1 to prepare black inks 1 to 7.

TABLE 1

|  | Ink 1 | Ink 2 | Ink 3 | Ink 4 | Ink 5 | Ink 6 | Ink 7 |
|---|---|---|---|---|---|---|---|
| Propylene glycol | 25 | 25 | 25 | 25 | 25 | 25 | 25 |
| Triethylene glycol | 5 | 5 | 5 | 5 | 5 | 5 | 5 |
| Surfynol 420 |  | 1 |  | 1.5 |  | 2 |  |
| BYK348 | 1 |  | 0.5 |  | 0.2 |  | 0.1 |
| AD 01 | 0.5 | 0.5 | 0.5 | 0.5 | 0.5 | 0.5 | 0.5 |
| PROXEL LV | 0.3 | 0.3 | 0.3 | 0.3 | 0.3 | 0.3 | 0.3 |
| Pigment dispersion | 30 | 30 | 30 | 30 | 30 | 30 | 30 |
| Liquid dispersion of resin particle | 30 | 30 | 30 | 30 | 30 | 30 | 30 |
| Deionized water | Balance | Balance | Balance | Balance | Balance | Balance | Balance |
| Dynamic surface tension (mN/m) | 38 | 33 | 45 | 30 | 50 | 28 | 52 |

Inks 1 to 7 were obtained by mixing the materials at the ratio (percent by mass) shown in Table 1 and stirring for one hour followed by filtering with a 1.2 μm cellulose acetate membrane filter under a pressure.

The materials in Table 1 represent the following.
Surfynol 420: Acetylene-based surfactant (manufactured by Nisshin Chemical Co., Ltd.)
BYK348: silicone-based surfactant (manufactured by BYK-Chemie GmbH)
AD01: Envirogem AD01 (manufactured by Air Products and Chemicals, Inc.)
PROXEL LV: Benzisothiazolin-3-one solution (manufactured by LONZA Japan)

The dynamic surface tension of the obtained inks 1 to 7 at a life time of 15 msec at 25 degrees C. was shown in Table 1.

The image forming apparatus illustrated in FIGS. 1 to 7 was used to create images for evaluation of fabric mainly composed of natural fiber.

The image forming apparatus was filled with the pre-processing fluid and the black ink and applied the black ink in an amount of 1.5 mg/cm$^2$ onto a cotton T-shirt (Printstar 085-CVT, white, manufactured by TOMS, Co., Ltd.) to create a solid image. The solid image was dried at 160 degrees C. for one minute by heat press to obtain an image for evaluation.

The image forming apparatus illustrated in FIGS. 1 to 7 was used to create the image for evaluation of fabric mainly composed of synthetic fiber.

The image forming apparatus was filled with the pre-processing fluid and the black ink and attached the pre-processing fluid in an amount of 0.5 mg/cm$^2$ onto a polyester T-shirt (glimmer 00300-ACT, white, manufactured by TOMS, Co., Ltd.) and then the black ink in an amount of 1.5 mg/cm$^2$ onto the T-shirt to obtain a solid image while the pre-processing fluid remained undried. The solid image was dried at 160 degrees C. for one minute by heat press to obtain an image for evaluation.

The drive voltage was controlled to adjust droplet size of the ink.

The drive frequency was controlled to adjust the distance between the two consecutive droplets discharged from the head.

The elevation of the platen was controlled to adjust the distance (gap) between the head and the fabric as shown in Table 2.

The gap between the head and the fabric was measured after the fluff portion of the fabric was eliminated. The fabric was smoothed by a pressing member before the measuring.

Evaluation on Image Density

The obtained images for evaluation were subjected to color measuring by using X-rite exact to evaluate the image density.

Evaluation Criteria
A: image density was 1.3 or higher
B: image density was from 1.25 to less than 1.3
C: image density was from 1.20 to less than 1.25
D: image density was less than 1.20

Evaluation on Unevenness of Image Density

The obtained images for evaluation were evaluated according to the following criteria.

Evaluation Criteria
A: Unevenness of Image density were not present but image was clear
B: Image density was almost even
C: Image density was slightly uneven without causing a practical problem
D: Image density was clearly uneven causing a practical problem The results are shown in Table 2. In Comparative Example 1, the second recording mode was not selected and images were formed on polyester fiber in the first recording mode.

TABLE 2

|  | Ink | Recording mode | Droplet size (pL) | Distance between dots (μm) | Gap (mm) | Media | Image density | Unevenness of density |
|---|---|---|---|---|---|---|---|---|
| Example 1 | 1 | First | 6 | 21 | 2 | Cotton | A | A |
|  |  | Second | 9 | 10 | 1 | Polyester | A | A |
| Example 2 | 1 | First | 6 | 42 | 2 | Cotton | A | A |
|  |  | Second | 9 | 10 | 1 | Polyester | A | A |

TABLE 2-continued

| | Ink | Recording mode | Droplet size (pL) | Distance between dots (μm) | Gap (mm) | Media | Image density | Unevenness of density |
|---|---|---|---|---|---|---|---|---|
| Example 3 | 1 | First | 6 | 42 | 2 | Cotton | A | A |
| | | Second | 9 | 21 | 1 | Polyester | A | A |
| Example 4 | 1 | First | 6 | 84 | 2 | Cotton | A | A |
| | | Second | 9 | 42 | 1 | Polyester | A | A |
| Example 5 | 1 | First | 6 | 21 | 2 | Cotton | A | A |
| | | Second | 9 | 14 | 1 | Polyester | A | B |
| Example 6 | 1 | First | 6 | 42 | 2 | Cotton | A | A |
| | | Second | 9 | 14 | 1 | Polyester | A | A |
| Example 7 | 1 | First | 6 | 21 | 2 | Cotton | A | A |
| | | Second | | 10 | | Polyester | B | B |
| Example 8 | 1 | First | 6 | 21 | 2 | Cotton | A | A |
| | | Second | 9 | 10 | | Polyester | A | B |
| Example 9 | 1 | First | 6 | 21 | 2 | Cotton | A | A |
| | | Second | | 10 | 1 | Polyester | B | A |
| Example 10 | 2 | First | 6 | 21 | 2 | Cotton | A | A |
| | | Second | 9 | 10 | 1 | Polyester | A | A |
| Example 11 | 3 | First | 6 | 21 | 2 | Cotton | A | A |
| | | Second | 9 | 10 | 1 | Polyester | A | A |
| Example 12 | 4 | First | 6 | 21 | 2 | Cotton | B | A |
| | | Second | 9 | 10 | 1 | Polyester | A | A |
| Example 13 | 5 | First | 6 | 21 | 2 | Cotton | A | A |
| | | Second | 9 | 10 | 1 | Polyester | A | B |
| Comparative Example 1 | 1 | — | 6 | 21 | 2 | Cotton | A | A |
| | | | | | | Polyester | D | C |
| Comparative Example 2 | 6 | First | 6 | 21 | 2 | Cotton | D | A |
| | | Second | 9 | 10 | 1 | Polyester | A | A |
| Comparative Example 3 | 7 | First | 6 | 21 | 2 | Cotton | A | A |
| | | Second | 9 | 10 | 1 | Polyester | A | D |

The results shown in Table 2 indicates that the image forming apparatus in each Example can produce images with good coloring and minimal unevenness of image density on both fabric mainly composed of natural fiber and fabric mainly composed of synthetic fiber.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatus comprising:
a container containing an ink; and
a head configured to discharge the ink to a fabric including a first fabric comprising synthetic fiber in an amount of more than 50 percent by mass and a second fabric comprising natural fiber in an amount of 50 percent by mass or greater, the head comprising a nozzle surface,
wherein the image forming apparatus is configured to make a determination of whether the fabric is the first fabric or the second fabric, and
control the head in accordance with the determination such that a first distance between positions of two consecutive droplets of the ink discharged from the head on the first fabric is shorter than a second distance between positions of two consecutive droplets of the ink discharged from the head on the second fabric,
wherein the ink has a dynamic surface tension of from 30 to 50 mN/m at a life time of 15 msec at 25 degrees C.

2. The image forming apparatus according to claim 1, wherein the first distance is at least 10 μm shorter than the second distance.

3. The image forming apparatus according to claim 1, wherein the first distance and the second distance are from 10 to 100 μm.

4. The image forming apparatus according to claim 1, wherein a droplet of the ink discharged to the first fabric is at least 3 pL larger than a droplet of the ink discharged to the second fabric.

5. The image forming apparatus according to claim 1, wherein a droplet of the ink discharged to the first fabric and a droplet of the ink discharged to the second fabric are from 5 to 30 pL.

6. The image forming apparatus according to claim 1, wherein the image forming apparatus is configured to further control the head in accordance with the determination such that, when the ink is discharged, a first gap between the nozzle surface and the first fabric is shorter than a second gap between the nozzle surface and the second fabric.

7. The image forming apparatus according to claim 6, wherein the first gap is at least 1 mm shorter than the second gap.

8. The image forming apparatus according to claim 6, wherein the first gap and the second gap are from 0.5 to 5 mm.

9. The image forming apparatus according to claim 6, further comprising a fabric holding member configured to hold the fabric.

10. The image forming apparatus according to claim 1, wherein the ink has a dynamic surface tension of from 32 to 45 mN/m at a life time of 15 msec at 25 degrees C.

11. The image forming apparatus according to claim 1, further comprising a detector configured to detect a component of the fabric.

12. The image forming apparatus according to claim 11, wherein the image forming apparatus is configured to further control the head in accordance with the determination such that a gap between the fabric and the nozzle surface is changed based on the component of the fabric detected by the detector.

13. The image forming apparatus according to claim 1, further comprising an input unit where at least one of a type and a component of the fabric is input.

14. The image forming apparatus according to claim 13, wherein the image forming apparatus is configured to further control the head in accordance with the determination such that a gap between the fabric and the nozzle surface is changed based on at least one of the type and the component of the fabric input in the input unit.

15. An image forming apparatus comprising:
a container containing an ink; and
a head configured to discharge the ink, the head comprising a nozzle surface,
wherein the image forming apparatus is configured to
make a determination of whether a fabric is a fabric comprising synthetic fiber or a fabric consisting of natural fiber, and
control the head in accordance with the determination such that a distance between positions of two consecutive droplets of the ink discharged from the head on the fabric comprising synthetic fiber is shorter than a distance between positions of two consecutive droplets of the ink discharged from the head on the fabric consisting of natural fiber,
wherein the ink has a dynamic surface tension of from 30 to 50 mN/m at a life time of 15 msec at 25 degrees C.

16. An image forming apparatus comprising:
a head configured to discharge an ink having a dynamic surface tension of from 30 to 50 mN/m at a life time of 15 msec at 25 degrees C., the head comprising a nozzle surface,
wherein the image forming apparatus is configured to
make a determination of whether a fabric is a fabric comprising synthetic fiber in an amount of more than 50 percent by mass or a fabric comprising natural fiber in an amount of 50 percent by mass or greater, and
control the head in accordance with the determination such that a distance between positions of two consecutive droplets of the ink discharged from the head on the fabric comprising synthetic fiber in an amount of more than 50 percent by mass is shorter than a distance between positions of two consecutive droplets of the ink discharged from the head on the fabric comprising natural fiber in an amount of 50 percent by mass or greater.

17. A printing method for an image forming apparatus, comprising:
providing a fabric including a first fabric comprising synthetic fiber in an amount of more than 50 percent by mass and a second fabric comprising natural fiber in an amount of 50 percent by mass or greater under a head of the image forming apparatus, the head comprising a nozzle surface;
determining whether the fabric is the first fabric or the second fabric under the nozzle surface, and
controlling the head to discharge an ink to the fabric in accordance with a result of the determination such that a first distance between positions of two consecutive droplets of the ink discharged from the head on the first fabric is shorter than a second distance between positions of two consecutive droplets of the ink discharged from the head on the second fabric,
wherein the ink has a dynamic surface tension of from 30 to 50 mN/m at a life time of 15 msec at 25 degrees C.

* * * * *